US007222905B2

(12) United States Patent
Jaeck

(10) Patent No.: US 7,222,905 B2
(45) Date of Patent: May 29, 2007

(54) RECONFIGURABLE TRUCK BED OR VEHICLE BODY

(76) Inventor: Edward Jaeck, 2505 E. Oakland St., Gilbert, AZ (US) 85296

(*) Notice: Subject to any disclaimer, the term of this patent is extended or adjusted under 35 U.S.C. 154(b) by 0 days.

(21) Appl. No.: 10/810,478

(22) Filed: Mar. 26, 2004

(65) Prior Publication Data

US 2004/0245805 A1 Dec. 9, 2004

Related U.S. Application Data

(60) Provisional application No. 60/460,529, filed on Apr. 4, 2003.

(51) Int. Cl.
*B60P 3/00* (2006.01)

(52) U.S. Cl. ......................... 296/1.07; 296/10; 296/43; 296/186.5

(58) Field of Classification Search .................. 296/10, 296/43, 3, 1.07, 186.5
See application file for complete search history.

(56) References Cited

U.S. PATENT DOCUMENTS 3,447,826 A * 6/1969 Gostomski
4,057,286 A * 11/1977 Elonen ........................ 296/43
4,917,430 A * 4/1990 Lawrence
5,249,823 A 10/1993 McCoy et al.
5,267,748 A * 12/1993 Curran
5,433,356 A * 7/1995 Russell
5,560,666 A * 10/1996 Vieira et al. ................... 296/3
6,099,061 A * 8/2000 Gessay .................... 296/26.08
6,170,896 B1 * 1/2001 Harris et al. ................... 296/3
6,199,894 B1 * 3/2001 Anderson ................... 280/638
6,270,137 B1 * 8/2001 Minix et al. ............... 296/24.3
6,450,379 B1 9/2002 Cook

OTHER PUBLICATIONS

Truck Bed Extension, www.TruckBedExtension.com, p. 1.
SportQuad.com, www.off-road.com, "Camping with the MultiRack Platform", pp. 1-7.

* cited by examiner

*Primary Examiner*—Stephen Gordon
(74) *Attorney, Agent, or Firm*—Schmeiser, Olsen & Watts LLP

(57) ABSTRACT

A reconfigurable truck bed has a plurality of receivers. A variety of accessories have structure that mates with the receivers in order to support the accessories on the truck bed. The accessories may be selectively positioned in a particular receiver or set of receivers. The accessories may also be conveniently oriented or reoriented for a particular circumstance or use. As such, the truck bed may be selectively reconfigured to meet the needs of a user and provide a particular benefit. In another aspect, a body structure or a chassis structure of any motor vehicle may be provided with receivers. Frames providing the receivers may be added onto bodies or chassis of any motor vehicle.

10 Claims, 9 Drawing Sheets

105 102 82 107 78 95 91 93 109

197 196 198 196 190 192

RECONFIGURABLE TRUCK BED OR VEHICLE BODY

This application claims priority to U.S. Provisional Application Ser. No. 60/460,529, filed Apr. 4, 2003, by Edward Jaeck and entitled "ADAPTABLE FLATBED FOR TRUCK APPLICATIONS", which is incorporated herein by reference in its entirety.

BACKGROUND OF THE INVENTION

1. Technical Field

This invention generally relates generally to motor vehicles bodies and more specifically to reconfigurable truck beds.

2. State of the Art

Pickup trucks have longitudinally vertical stake holes opening through upper edges of the side walls of the truck beds. Flatbed trucks have similar stake holes in the upper surface of the bed for forming stake bed trucks. These trucks of the past can be reconfigured to include livestock guards around peripheries of the truck beds.

Other accessories applied to motor vehicles include bike racks, sports equipment racks, and luggage carriers. These accessories are typically mounted on bumpers, originally provided luggage racks, and vehicle rain gutters.

DISCLOSURE OF THE INVENTION

The present invention relates generally to motor vehicles bodies and more specifically to reconfigurable truck beds. Motor vehicle bodies of the past, and truck beds in particular, have been deficient in providing reconfigurability, being limited generally to vertical adjustments. Body structure, chassis structure, and frames added onto bodies or frames of the past have not provided the advantages of the present invention. On the other hand, in accordance with the present invention, receivers may be provided in vehicle bodies, in chassis, and in truck bed platforms to supportingly receive any of a variety of accessories that are configured to be selectively supported in the receivers. An accessory, for purposes of the present application, may be defined as anything that is supported in sockets or on receivers of an object, and that enhances or adds functionality of the object on which the accessory is supported.

In a simple form, the present invention may include a motor vehicle having a body with at least one body receiver that selectively receives at least one accessory. The body may have structure forming at least one body receiver. The accessory may include one or more of a ladder rack, an electrician's reel, a barbeque accessory, a tool supporting table, a winch, a hunting accessory, a fishing accessory, a bike rack, a ski rack, a ramp, a width extension, and a length extension.

The structure forming at least one body receiver may include a socket formed by an opening disposed in the body. The accessory may have an insert connected to the accessory and selectively located in the socket in a deployed state to support the accessory on the body. The structure may provide the socket as a lengthwise horizontal socket, and the insert may include a shaft having a longitudinal axis disposed horizontally when the insert is in the deployed state.

The body receiver may be a first body receiver. The motor vehicle may further have a plurality of body receivers including said first body receiver. The plurality of body receivers may include at least one lengthwise vertical socket. The insert may be selectively received in the lengthwise vertical socket with the longitudinal axis of the insert disposed vertically when the insert is in the deployed state.

In one aspect, the plurality of body receivers may include a plurality of lengthwise horizontal sockets. In another aspect, the motor vehicle of the present invention may have a plurality of the accessories associated therewith.

In one embodiment, the at least one accessory may include a combination width extension and side wall for a bed of a truck. The combination width extension and side wall may form a widened flatbed for the truck when supported in the socket.

In another embodiment, the accessory may include a combination length extension and end wall for a bed of a truck. The combination length extension and end wall may form a lengthened bed for the truck when supported in the socket.

In another aspect of the invention, the plurality of body receivers may be formed integrally with the body of the vehicle. Alternatively, the plurality of body receivers may be added to the body of the vehicle.

In another simple form, the invention may include a reconfigurable truck bed. The reconfigurable truck bed may include at least one receiver in the bed and at least one accessory selectively supported in the receiver. The accessory may include at least one of a width extension and a length extension in which the accessory is also a ramp.

The reconfigurable truck bed of the present invention may include a generally horizontally disposed platform including a platform frame covered by sheet material. The reconfigurable truck bed may further have a plurality of receivers including the at least one receiver. At least some of the receivers may extend at least partially through the platform. The plurality of receivers may include a plurality of horizontal receivers and/or a plurality of vertical receivers. The plurality of receivers may include tubular sockets having tube ends forming receiver openings through the truck bed.

In still another simple form, the present invention may include a platform for a truck. The platform may have a frame including at least one elongated receiver that extends longitudinally in a direction other than a generally vertical direction. The platform may also have a sheet of material overlying the frame. The platform may include at least a portion of a chassis of the truck. Alternatively, the platform may be added to a chassis of the truck.

The frame of the platform may have a plurality of elongated receivers including the at least one elongated receiver. The plurality of elongated receivers may each be configured to extend longitudinally in directions other than a generally vertical direction. The frame may further include a plurality of elongated receivers that extend longitudinally in the generally vertical direction.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate generally to motor vehicles bodies and more specifically to reconfigurable truck beds.

Figure 1:
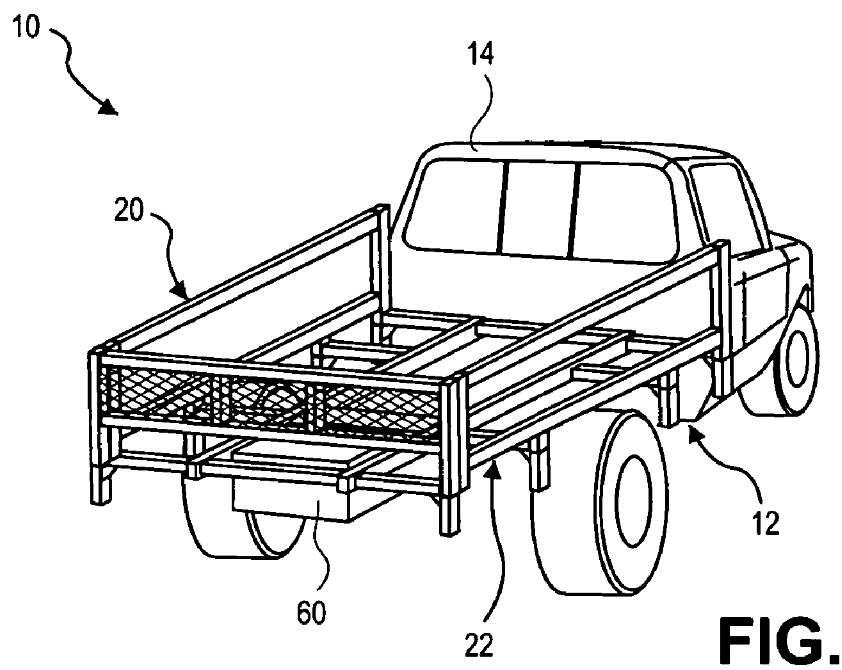
FIG. 1 is a perspective view of a truck with a flatbed assembly according to the present invention.

FIG. 1 illustrates a truck generally designated 10. The truck 10 includes a truck chassis 12 having a cab 14 at one end thereof and a flatbed assembly 20 mounted adjacent to the cab 14. The flatbed assembly 20 may include a platform formed of a plurality of frame members, examples of which are described in greater detail below. These frame members may be left bare or covered by sheet material. The platform may also include any of a plurality of accessories for mounting to the frame members. The truck chassis 12 can essentially be a chassis of any vehicle that can support the flatbed assembly 20. Such chassis may include those of vehicles converted into trucks, ½ ton truck chassis, ¾ ton truck chassis, 1 ton or larger truck chassis. Alternatively, a much smaller chassis may also be adapted to include or have aspects of the present invention added on. For example, a car or other smaller capacity vehicle may incorporate receivers and any of a plurality of a variety of accessories as described in the exemplary embodiments below.

Figure 2:
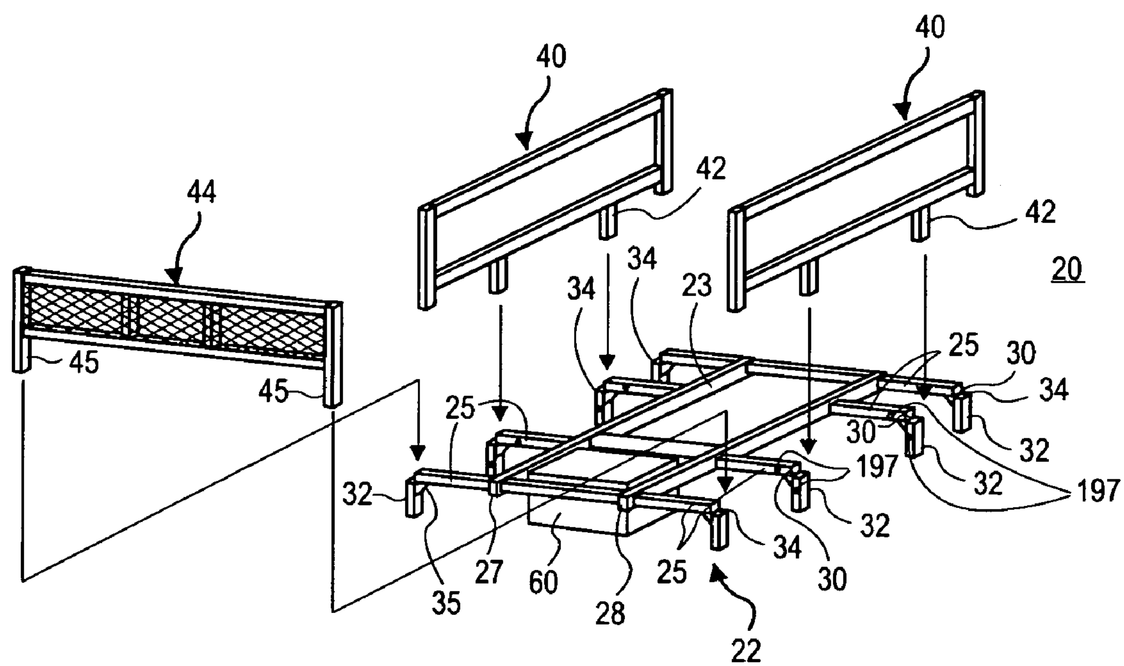
FIG. 2 is an exploded perspective view of the flatbed assembly of FIG. 1.

With reference to FIG. 2, the flatbed assembly 20 includes a frame 22 that has a pair of fore and aft extending frame members 23 and 24 and a plurality of transversely extending frame members 25. The fore and aft extending frame members 23 and 24 terminate in ends 27 and 28 respectively. The ends 27 and 28 define apertures that open outwardly in a rearward direction for receiving horizontal elements as will be described below. Transverse frame members 25 may extend substantially perpendicularly from the fore and aft extending frame members 23 and 24. The transverse frame members 25 may be supported by additional structural members, such as gussets or beams, that interconnect adjacent transverse frame members 25 or transverse frame members to the fore and aft extending frame members. Each of the transverse frame members 25 may terminate in an end 30 defining an aperture opening outwardly in a substantially lateral direction with respect to the truck chassis 12 for receiving horizontal elements.

While the frame members 23, 24, and 25 are shown to extend in fore and aft alignment and at perpendicular angles relative to each other, it is to be understood that the frame members may be disposed at any angle relative to each other, and may or may not be connected to each other. However, at least some of the frame members will have ends extending outwardly through a truck bed or body of the vehicle. In the exemplary embodiment of FIGS. 1-2, the fore and aft extending frame members 23 and 24 and the transverse frame members 25 are coupled together to form the frame 22 that is mounted on the truck chassis 12. The frame members 23, 24, and 25 may be coupled to each other by any of a variety of fastening mechanisms including, but not limited to, welding, bolting, and/or riveting. It is to be understood that the frame 22 may be mounted on a frame of the chassis 12 by similar fastening mechanisms including, but not limited to, welding, bolting, and/or riveting.

The frame 22 may further include a plurality of tubular members 32 coupled to the ends 30. The tubular members 32 may each have an end 34 defining an aperture opening generally upwardly relative to the truck chassis 12 for receiving vertical elements. The tubular members 32 may be coupled to the ends 30 of the transverse members 25 by gussets 35 or other connecting and/or strengthening structure. In FIGS. 1 and 2, the tubular members 32 and the transverse members 25 are shown in an aligned relationship. However, it is to be understood that the tubular members 32 may be offset relative to the transverse members 25 and still provide their intended function. On the other hand, the alignment of tubular members 32 with the transverse members 25 shown in FIGS. 1 and 2 advantageously positions the apertures of the ends 30 and 34 so that an accessory need not be shifted fore or aft when shifted from a horizontally to a vertically oriented mounting. In any case, the transverse members 25 and the tubular members 32 provide apertures and other structure for receiving and supporting both longitudinally horizontal elements and longitudinally vertical elements, respectively. It is to be understood that additional tubular members 32 may also be provided adjacent to the ends 27 and 28 of the fore and aft extending frame members 23 and 24 in order to provide additional upwardly opening apertures for receiving longitudinally vertical elements and/or longitudinal elements at other angles. Furthermore, it is to be understood that while longitudinal elements provide a stronger mounting structure, shorter elements may be inserted into the openings in a generally longitudinal direction relative to the transverse frame members 25 and/or the tubular frame members 32.

Still further, it is to be understood that the frame 22 may have any number of frame members oriented in horizontal, vertical, or other orientations. At least some of these frame members may be positioned and oriented to have apertures opening outwardly relative to a truck bed platform or vehicle body. These apertures may thus form receivers for accepting and holding complimentary or mating elements of accessories for selectively reconfiguring the truck bed or body. The complimentary or mating elements may have structure that is longitudinal in a vertical or horizontal direction. Alternatively, the receivers may be oriented to receive the complimentary elements in orientations other than horizontal or vertical. Further alternatively, the receivers may be provided as protrusions that receive openings or apertures of the complimentary or mating elements of the accessories.

In the specific embodiment shown in FIGS. 1-2, the flatbed assembly further includes side panels 40. Each of the side panels includes longitudinally vertical elements in the form of inserts 42. The inserts 42 extend from a lower edge of the side panels 40. The inserts 42 are spaced a distance corresponding to the fore and aft spacing of the apertures at the ends 34. Thus the side panels 40 may be oriented vertically with the inserts 42 functioning generally like stakes in a stake bed truck. As such, the inserts 42 extend downwardly relative to the truck chassis 12 and engage in the apertures and sockets formed by the tubular members 32. Likewise, a rear panel 44 may include inserts 45 for receipt in apertures of the ends 34 in the rear most tubular members 32. Thus, the flatbed assembly is configured into a truck box in which the panels 40 and 44 have an upright configuration as shown in FIG. 1. Like frame 22, the side panels 40 and the rear panel 44 can be covered with a skin of material including, but not limited to, sheet metal, plastics, and/or wire mesh. Alternatively, the frame 22 and panels 40, 44 may be left opened. When the frame 22 is covered, however, at least some of the apertures may remain accessible and uncovered in order to provide receivers for accepting inserts.

Figure 3:
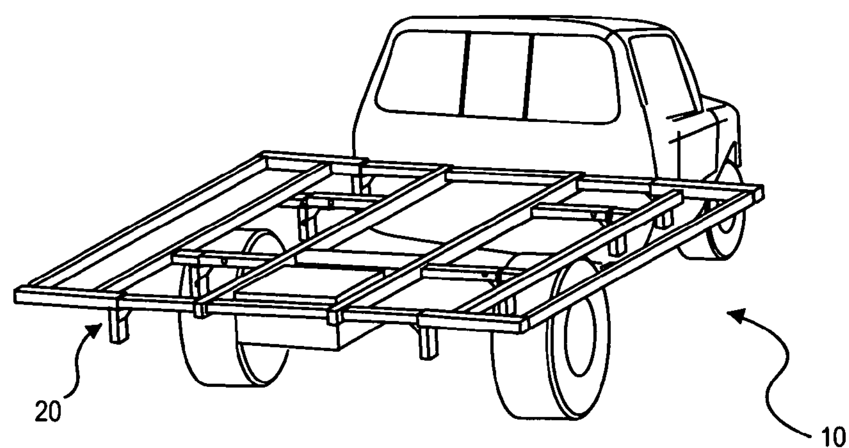
FIG. 3 is a perspective view of the flatbed assembly of FIG. 1 reconfigured to have a wider bed.
Figure 4:
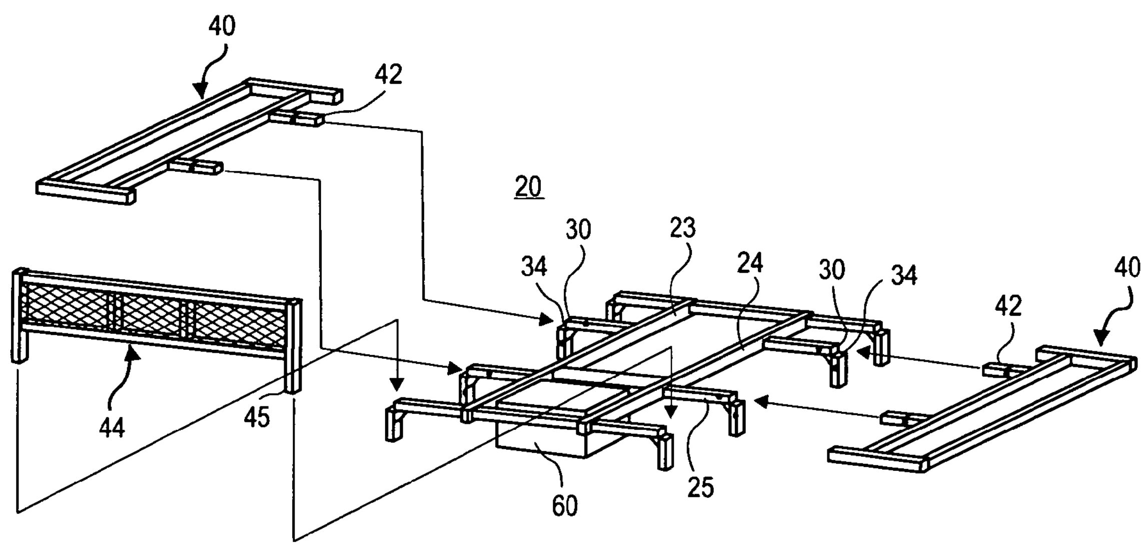
FIG. 4 is an exploded perspective view of the flatbed assembly of FIG. 3.

As shown in FIGS. 3 and 4, the flatbed assembly 20 is illustrated in a prone configuration. In this configuration, the inserts 42 of the side panels 40 are removed from the apertures at the ends 34 and are inserted horizontally into the apertures at the ends 30. In this orientation, the inserts 42 act as longitudinally horizontal elements and the panels 40 can be supported in the ends 30 to increase the overall width of the frame 22. Thus, the side panels 40 form generally uninterrupted extensions to the platform formed by the frame 22 and the side panels 40. In this way, a flatbed with increased width is provided. As may be appreciated, one or both side panels 40 may be used alone or in conjunction with the rear panel 44. Similarly, the rear panel 44 may be used to increase a fore and aft or dimension of the truck platform. In order to extend the truck bed in aft direction in this manner, the inserts 45 in the rear panel would be disposed in corresponding longitudinally horizontal tubular frame members, (not shown, yet similar to elements 32 described above). On the other hand, FIG. 4 shows how the rear panel 44 may be inserted in an upright orientation with the truck bed in its widened configuration.

It is to be understood that while the inserts 42 and 45 are shown to extend generally in the same plane as their respective panels 40 and 45, these inserts could be oriented at right angles to the panels and could engage receivers that extend longitudinally in a direction perpendicular to the desired orientation of use for the panels. Furthermore, other angles of orientation for the receivers and inserts are also possible without departing from the spirit and scope of the invention. Still further, structural engagements between the receivers and the inserts other than the elongated mating relation shown in the Figures may be incorporated without departing from the spirit and scope of the invention. By way of example and not by way of limitation, a toothed engagement, a tenon and mortise engagement, or other relative structure that prevents rotation between a receiver and an accessory could be substituted for the structure shown in the exemplary embodiments of FIGS. 1-8. Such structures have the capability of providing fixed yet easily separable couplings while generally taking up less space than the elongated couplings of the exemplary embodiments.

Figure 5:
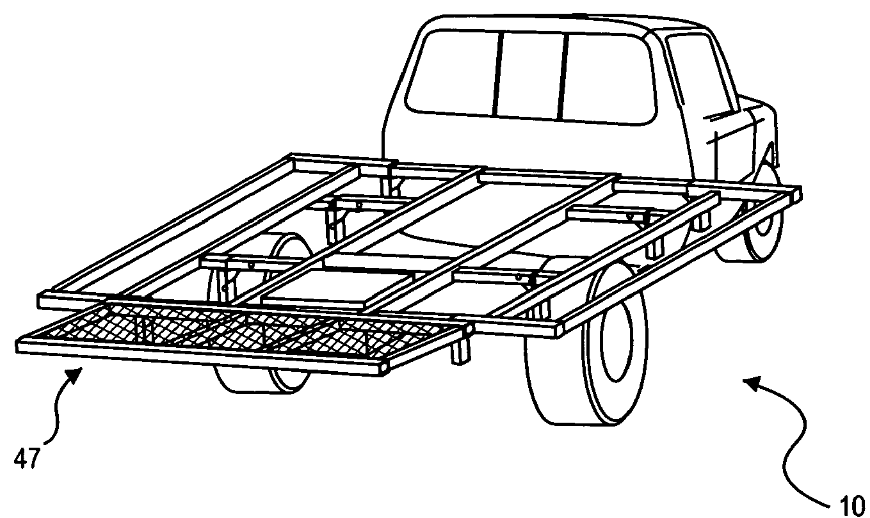
FIG. 5 is a perspective view of the truck with the flatbed assembly of FIG. 1 reconfigured to include both a widened and a lengthened bed.
Figure 6:
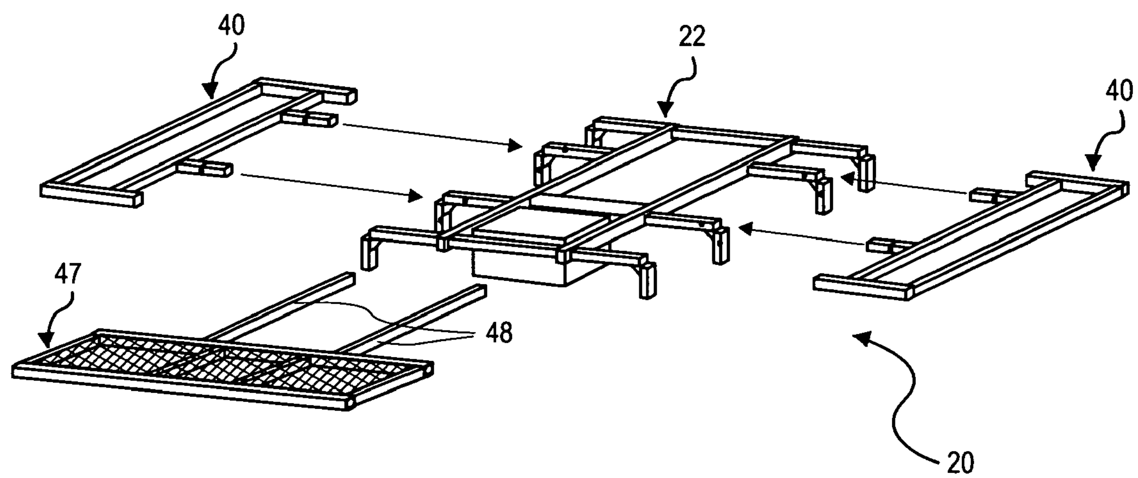
FIG. 6 is an exploded perspective view of the flatbed assembly of FIG. 5.

As shown in FIGS. 5 and 6, the flatbed assembly 20 is illustrated in a prone configuration similar to that described with regard to FIGS. 3 and 4 above. However, in the illustration of FIGS. 5 and 6, the rear panel 44 has been replaced by a rear extension 47. The rear extension 47 includes extended inserts 48 that extend from a forward edge thereof. The extended inserts 48 are spaced for receipt in the apertures at the ends 27 and 28 of the fore and aft extending frame members 23 and 24. The extended inserts 48 are somewhat longer than the previously described inserts for purposes that will be described below. It is to be understood that the rear extension 47 can be used in combination with the side panels 40, as shown in FIG. 5, to increase both the width and the length of the flatbed area. Alternatively, the rear extension may be used without side panels 40 to increase only the length. Further alternatively, the side panels 40 can be oriented in the upright configuration with or without the rear extension 47 inserted.

Figure 7:
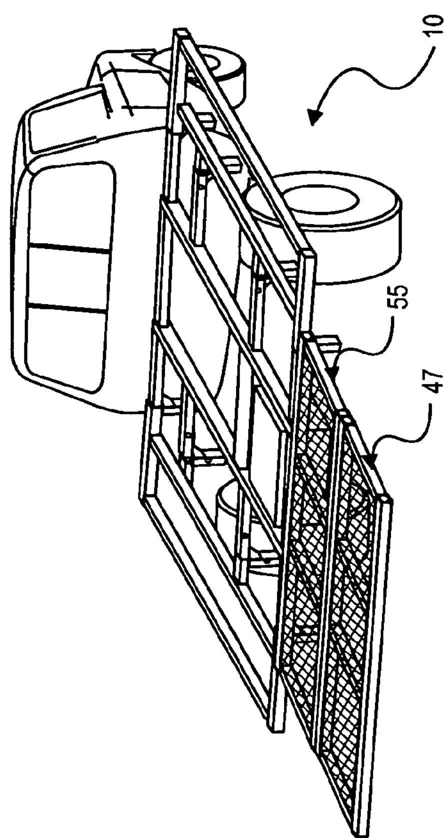
FIG. 7 is a perspective view of the truck with the flatbed assembly of FIG. 1 reconfigured to include a widened and a lengthened bed including an additional extension.
Figure 8A:
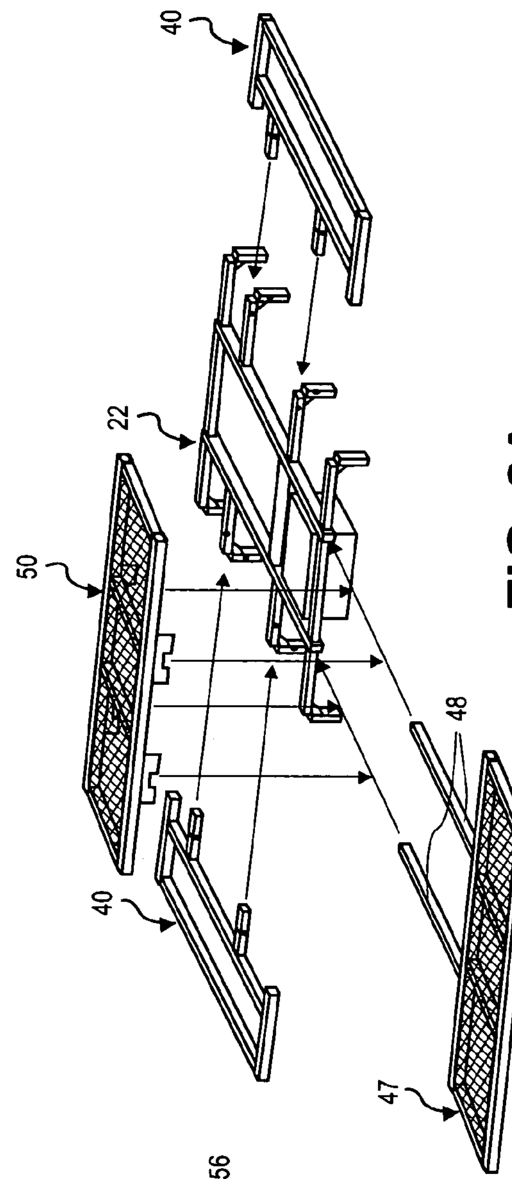
FIG. 8A is an exploded perspective view of the flatbed assembly of FIG. 7.

As shown in FIGS. 7 and 8A, an additional extension 50 is illustrated. The additional extension 50 can further increase the length of the flatbed assembly 20. In this configuration, the rear extension 47 is pulled rearwardly to expose a portion of the extended inserts 48. Thus, the increased length of the inserts 48 advantageously permits placement and support of the additional extension 50 on the extended inserts 48. The additional extension 50 is then placed between the rear of the frame 22 and the rear extension 47. Brackets 52 on a bottom surface of the additional extension 50 provide a stable engagement between the additional extension 50 and the extended inserts 48. It is to be understood that the side panels 40 can be extended outwardly in the same manner by providing extended inserts thereon and providing additional side extensions as needed for further increased width.

Figure 8B:
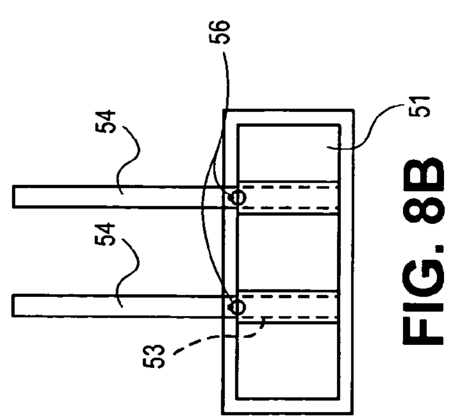
FIG. 8B is a top plan view of an alternative length extension.

FIG. 8B shows an alternative configuration for the length extension 47 shown in FIGS. 5-8A. In this case, a panel 51 has sockets 53 in which removable inserts 54 may be received to provide a length extension analogous to the rear extension 47 described above. As shown, the removable inserts 54 may be secured in the sockets 53 by removable pins 56, for example. It is to be understood that any or all of the inserts described herein may be provided as removable inserts in this manner without departing from the spirit and scope of the invention.

As shown in FIGS. 1-8, a storage box 60 can be provided in the flatbed assembly 20. The box 60 may be mounted between the fore and aft extending frame members 23 and 24 proximate the rear ends 27 thereof. If a skin is utilized to cover the frame 22, a panel can be provided with hinges to cover the box 60 as shown and described with regard to FIG. 10A below.

The sizes of the various panels 40, 44, 47 and frame elements can be selectively varied depending upon the laws of a particular region and the preferences of a particular user. While the exemplary embodiments described above with reference to FIGS. 1-8 have the inserts extending longitudinally in the same plane as the panels, the inserts could be configured to extend perpendicularly so that a user would insert the side walls horizontally and the width extensions vertically. Alternatively, one or more adaptors could be provided for enabling the accessories to be supported in a variety of orientations while being supported in receiver(s) of a single orientation. Further alternatively, it is to be understood that the accessories themselves may include additional receivers for supporting additional accessories. For example, the panels 40 disposed horizontally could have receivers along outer edges for supporting additional panels extending vertically for a widened bed having a side wall. Additionally, it is to be understood that various other accessories and fixtures can be provided for use with the receivers described above.

Figure 9:
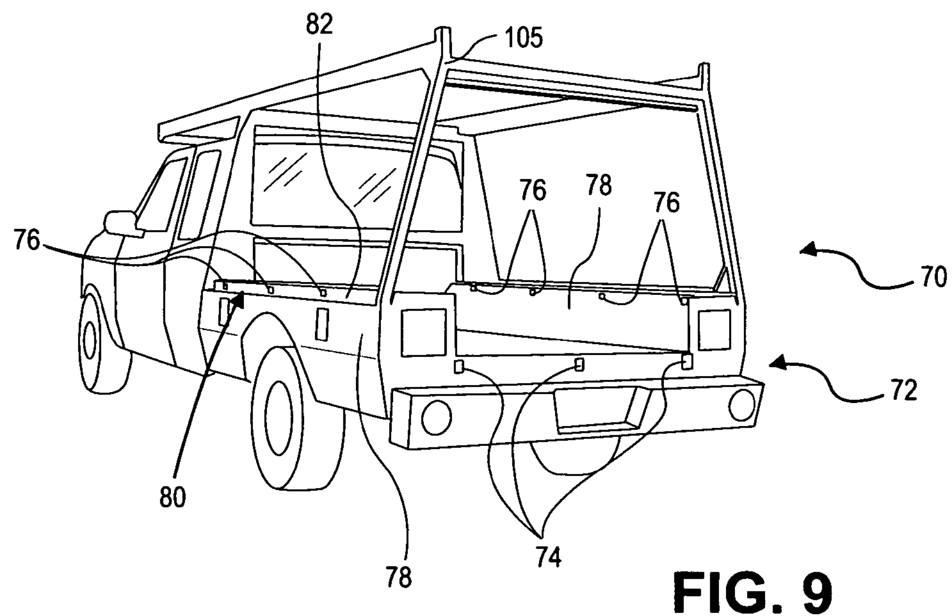
FIG. 9 is a perspective view of a truck with a utility bed in accordance with the present invention.

FIG. 9 shows a truck 70 having a utility truck bed 72. In this embodiment, fore and aft extending frame members 74 are disposed at a height that is lower than a height of transversely extending frame members 76. This configuration of the utility truck bed 72 includes box side walls 78. As may be appreciated, the transversely extending frame members 76 are tubular frame members that extend substantially completely through the box side walls 78. Laterally outward upper edges 80 of the box side walls 78 form channels 82 having a vertical wall through which apertures of the transversely extending frame members 76 extend. The channels 82 also have horizontal walls through which similar apertures of vertically extending frame members extend as will be described with regard to FIG. 10B below.

Figure 10A:
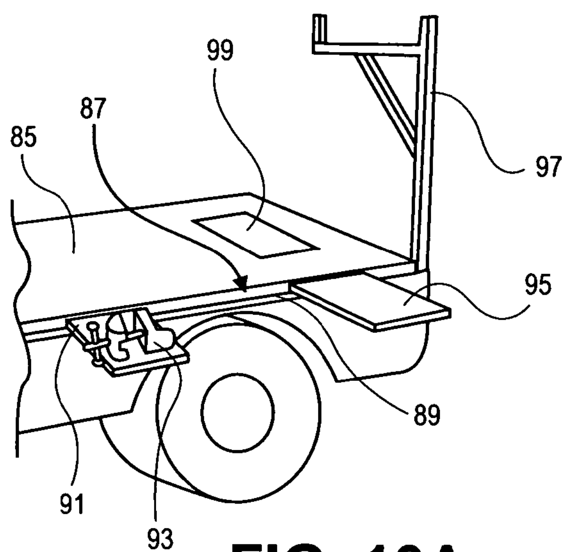
FIG. 10A is a cut away perspective view of the bed of FIG. 1 with a variety of accessories supported thereon.

FIG. 10A is a cutaway perspective view of the flatbed embodiment of FIGS. 1-8 without the side and rear extensions installed. The frame 22 is covered with a sheet material to provide a platform 85. As shown, laterally outward upper edges 87 of the platform 85 may be configured to advantageously include channels 89 similar to the channels 82 of the utility bed of FIG. 9. In this way, vertically extending frame members or tubular members 32 may be disposed with their apertures extending upwardly through a horizontal surface of the channel 89. The resulting vertically oriented receivers or sockets are thus disposed for readily receiving inserts of side panels 40, rear panels 44, or other accessories. For example, a small table 91 supports a vice 93. The table 91 has a downwardly extending insert supported in a vertically extending frame member having an aperture opening out through the channel 89. A larger work table 95 is likewise supported in one or more vertically extending frame members in the channel 89. The table 95 provides a convenient support for receiving tools or other objects. A ladder rack 97 likewise may include a vertically extending insert supported in a vertically extending frame member that opens out into the channel 89. Alternatively, each of the table 91, table 95, and the ladder rack 97 could be supported on a horizontally extending inserts that are received in transversely extending frame members opening out into the channel 89. Also shown in FIG. 10A, a door 99 may provide access through the platform to the box 60 as described above.

An advantage of providing the receivers by apertures opening outwardly through the ends 30 and 34 in the channels 89 is greater strength and structural integrity. This is especially beneficial when an accessory will experience heavy loading. By locating the apertures and the associated receivers in the channels, the structure that receives load forces is moved inboard relative to the platform 85. This reduces a lever arm that would otherwise be greater in an embodiment that has no channel 89.

Figure 10B:
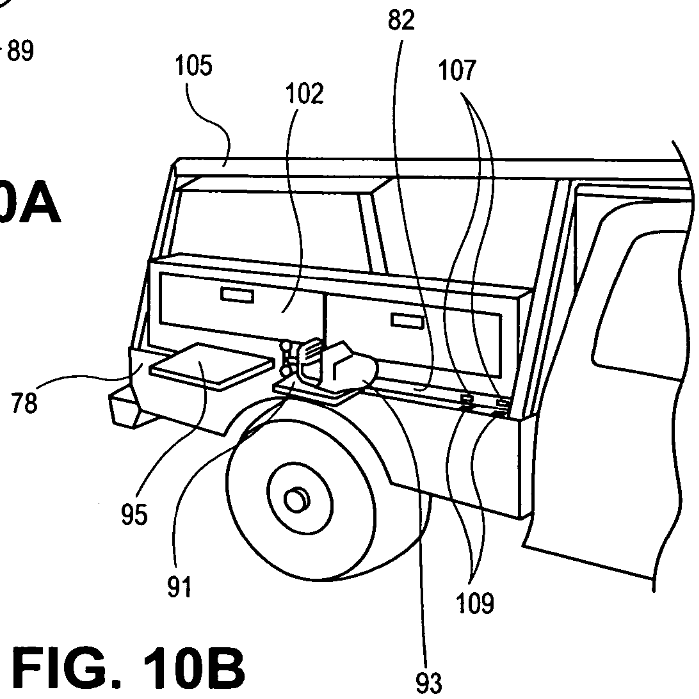
FIG. 10 B is a cut away perspective view of the truck of FIG. 9 having a variety of accessories supported on the utility bed thereof.
FIG. 10C is a perspective view of an electrician's reel accessory.
FIG. 10D is a perspective view of a barbecue accessory.
FIG. 10E is a perspective view of a winch accessory.
FIG. 10F is a perspective view of a carrying container accessory.
FIG. 10G is a perspective view of a rack accessory.
FIG. 10H is a perspective view of a ski rack or surfboard rack accessory.
FIG. 10I is a perspective view of a ramp accessory.
FIG. 10J is a schematic end view of the barbecue accessory of FIG. 10D showing the capability of reorientation.

FIG. 10B is a perspective view of the utility bed 72 of FIG. 9 with accessories mounted thereon. For example, the smaller table 91 supporting a vice 93 and the larger table 95 are supported in vertically extending frame members as described with regard to FIG. 10A above. Additionally, a tool box 102 is supported on the box side walls 78. The tool box 102 may also have inserts extending into receivers to support the tool box 102 in a similar manner to the side panels and accessories described above. A utility rack 105 as shown in FIGS. 9 and 10B may also be provided with inserts that are received and supported in receivers.

FIG. 10B shows a pair of receivers or sockets 107 that are horizontally oriented and a pair of vertically oriented receivers or sockets 109 that are aligned with the horizontally oriented sockets 107. As may be appreciated, these sockets can be spaced at greater or lesser intervals depending upon the accessories to be received therein. Furthermore, the horizontally and vertically oriented sockets 107 and 109 may be offset relative to each other in the fore and aft direction. As described above with regard to FIG. 10A, configuring the receivers 107 and 109 to open out through the channel 82 as shown in FIG. 10B has the advantage of providing greater strength and structural integrity.

Figure 10C:
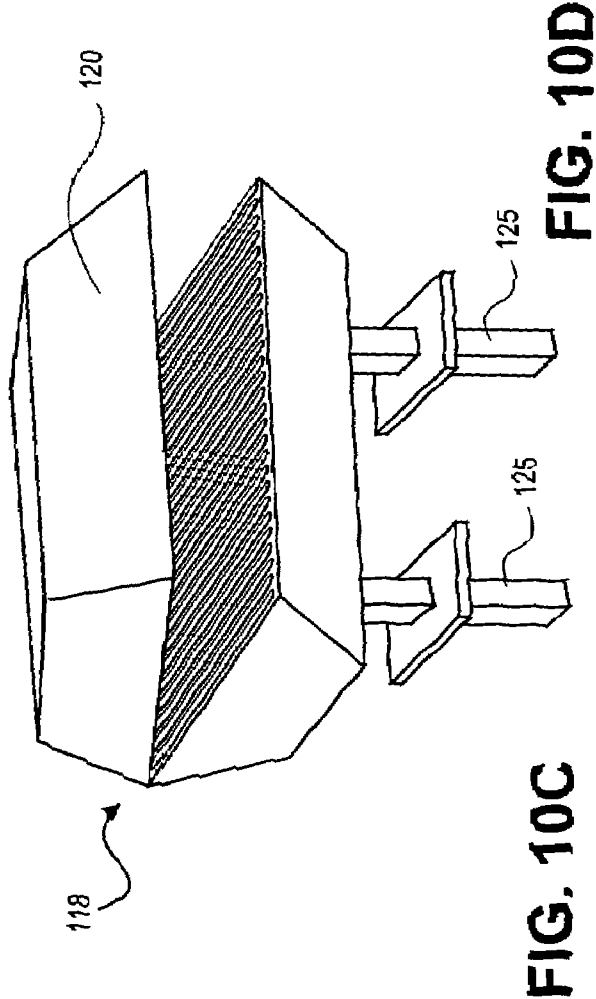

FIG. 10C is a perspective view of an electrician's reel 111 and a reel support 113. The reel support has a vertically extending insert 115. As may be appreciated, the accessory of FIG. 10C provides an easily deployed electrician's reel for facilitating dispensing a wire from the reel 111. Thus, a truck bed can be reconfigured to advantageously support the need of a particular user, or to support the needs of a user at a particular time or in a particular circumstance.

Figure 10D:
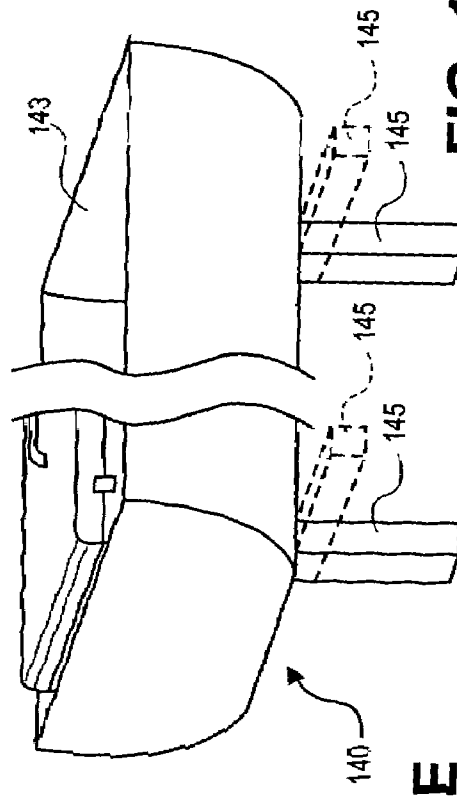

FIG. 10D is a perspective view of a barbecue accessory 118. The barbecue accessory 118 may include a barbecue grill 120 and one or more supporting inserts 125. The barbecue accessory 118 may incorporate the barbecue grill 120 of any style or configuration desired. The barbecue accessory 118 advantageously provides an easily portable barbecue that is also conveniently supported in a state of use mounted in receivers on the truck bed, for example.

Figure 10E:
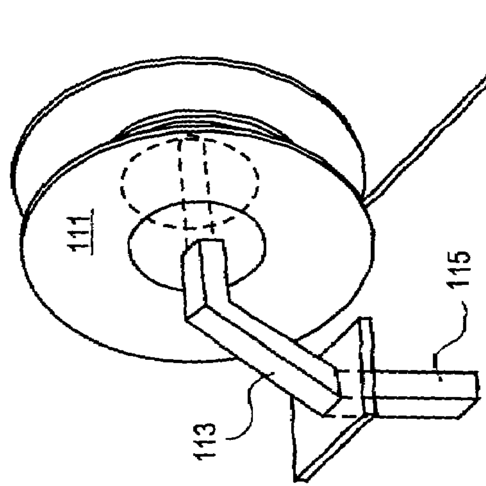

FIG. 10E is a perspective view of a winch accessory 130 having a horizontal insert 135 for supporting the winch accessory 130 in a receiver of a truck bed, for example. Alternatively, the insert 135 may be provided as a vertical insert as shown in dashed lines. As may be appreciated, the winch accessory 130 advantageously provides an easily repositionable winch. Thus, depending upon the pulling needs and the access to an object to be pulled, the winch accessory 130 can be selectively supported in a receiver that is best adapted for the particular circumstances. In particular, the insert may be aligned with a direction of pull to minimize torque forces during operation.

Figure 10F:
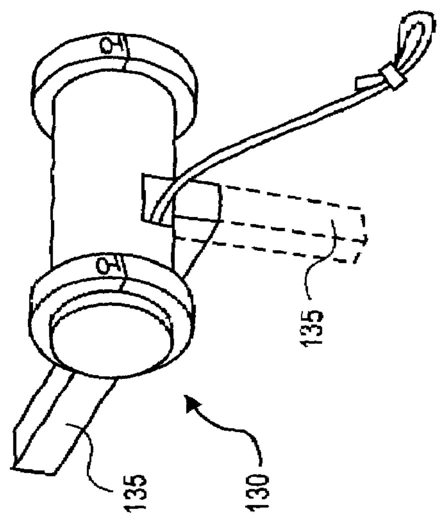

FIG. 10F is a perspective view of a container accessory 140 in accordance with the present invention. The container accessory 140 may have solid walls, or may alternatively take the form of a wire basket. The container accessory 140 may have a container 143 of any shape and size, and vertical or horizontal inserts 145. The container 143 may be used for storage and transport of any of a variety of objects. By way of example and not by way of limitation, the container accessory 140 may be used to store and/or transport liquid containers, food, fuel, camping gear, sports equipment, hunting gear, and/or game.

Figure 10G:
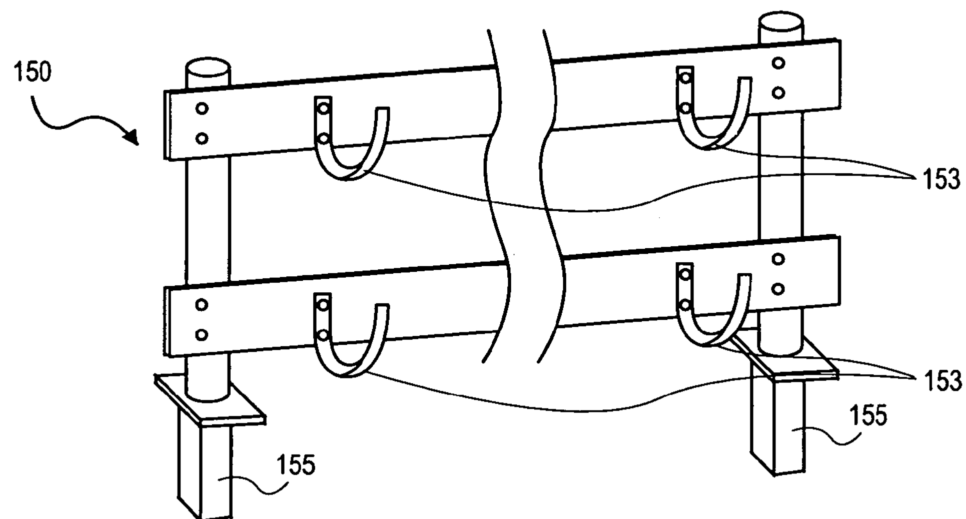

FIG. 10G is a perspective view of a rack accessory 150 that may be of any shape or size. The rack accessory 150 will generally include a plurality of hooks 153 or other supports. The rack accessory may also include straps or other securing mechanisms for securing items to be supported on the rack accessory 150. Vertical inserts 155 are adapted to support the rack accessory 150 in receivers on the bed of a truck, for example. The rack accessory 150 may be configured to be a universal rack accessory for supporting any of the variety of objects such as bicycles, fishing poles, guns, pipes, or yard tools, for example. Alternatively, the rack accessory 150 may be configured to support a specific object of set of objects. In any case, the rack accessory 150 can be selectively deployed and supported in receivers of a truck bed, for example, for advantageously supporting any of the variety of objects to suit the particular needs of a user.

Figure 10H:
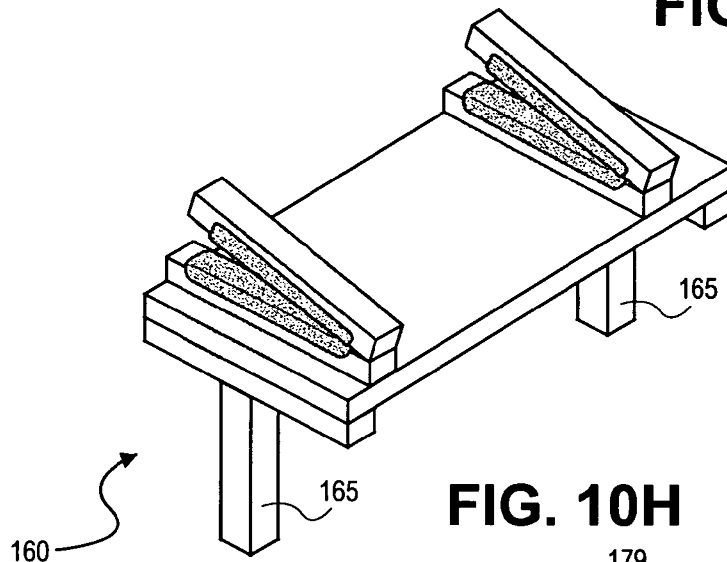

FIG. 10H is a perspective view of a ski and surf rack accessory 160 for supporting and transporting objects such as snow skies, snow boards, water skies, and/or surf boards. The ski and surf rack accessory 160 has inserts 165 for supporting the ski and surf rack accessory 160 in the bed of a truck, for example.

Figure 10I:
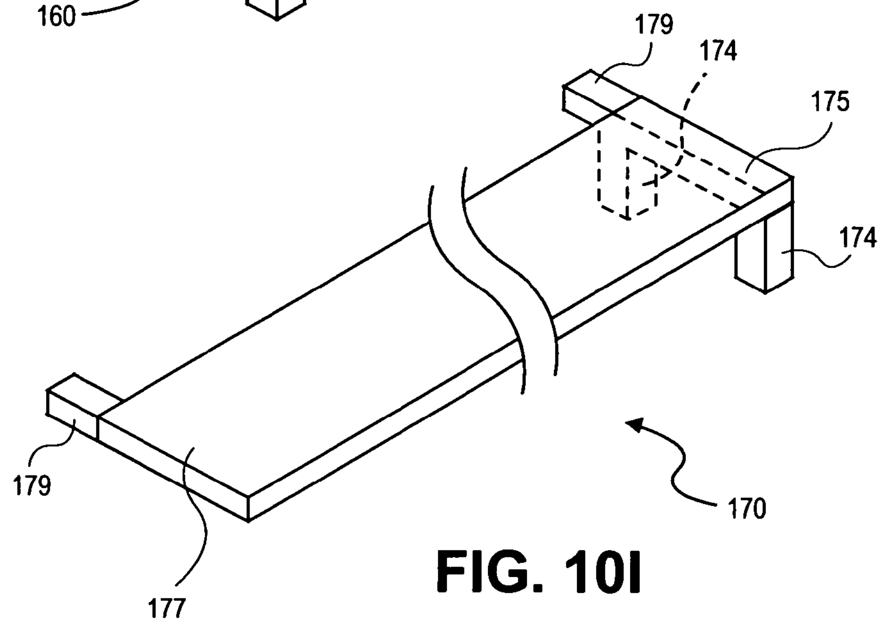

FIG. 10I is a perspective view of a ramp accessory 170. The ramp accessory 170 has inserts 174 for supporting one end 175 of the ramp accessory 170 in receivers or sockets of a truck bed while another end 177 rests on the ground, for example. Thus, the ramp accessory 170 may be advantageously used for facilitating loading of a wheeled vehicle or other object onto the bed of the truck. As may be appreciated, the ramp accessory 170 may also be a side panel or a rear panel similar to panels 40, 44, and 47 described above. As such, the ramp accessory 170 may include additional inserts 179 similar in structure and function to the inserts 42, 45, and 48 described above with regard to FIGS. 1-8. Thus, a combination panel and ramp accessory has the advantage of facilitating loading of ATV's or motorcycles, for example, and providing a secure side panel, length extending panel, and/or width extending panel. It is to be understood that the inserts 174 may be relatively small in comparison to the receivers in which they are to be supported in order to provide tolerance for different height beds and different contours of ground on which the ramp accessory 170 can still properly function. Alternatively, the ramp accessory 170 may be adapted with a pivoting link for the same purpose.

Figure 10J:
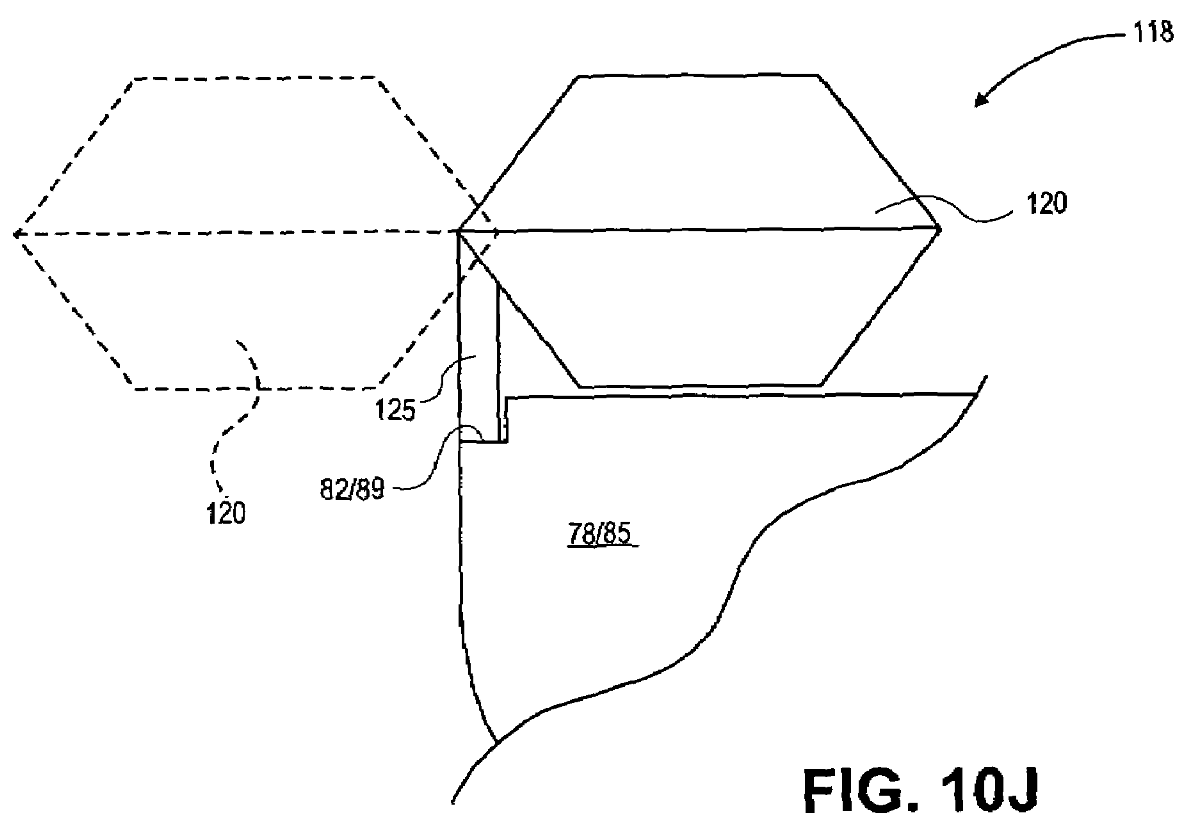

As shown in FIG. 10J, the accessories can be supported in a variety of orientations that may be suited to a particular condition or application. In particular, FIG. 10J shows the barbecue accessory 118 supported with a main portion of the barbecue 120 extending inwardly in overlying relation to the platform 85 or side wall 78 for stowage and transport. Alternatively, the barbecue 120 may be supported in an orientation extending outwardly as shown in dashed lines for use in a tailgate application at a ball game, for example. This reorientation capability may be applied to any or all of the accessories. For example, the small table 91 and the work table 95 may be advantageously supported in an inwardly extending orientation substantially overlying the platform 85 or side wall 78. This reorientation capability also provides for safe transportation of the accessories since they will generally not extend outside a perimeter of the truck bed. Alternatively or additionally, any or all of the accessories may be supported in the horizontally oriented receivers in order to provide a desired orientation for the accessories. Supporting the tables 91, 95, and the barbecue 120 in the horizontally oriented receivers would cause them to extend in a vertical orientation that may be advantageous for storing, transport, or other applications.

Figure 11A:
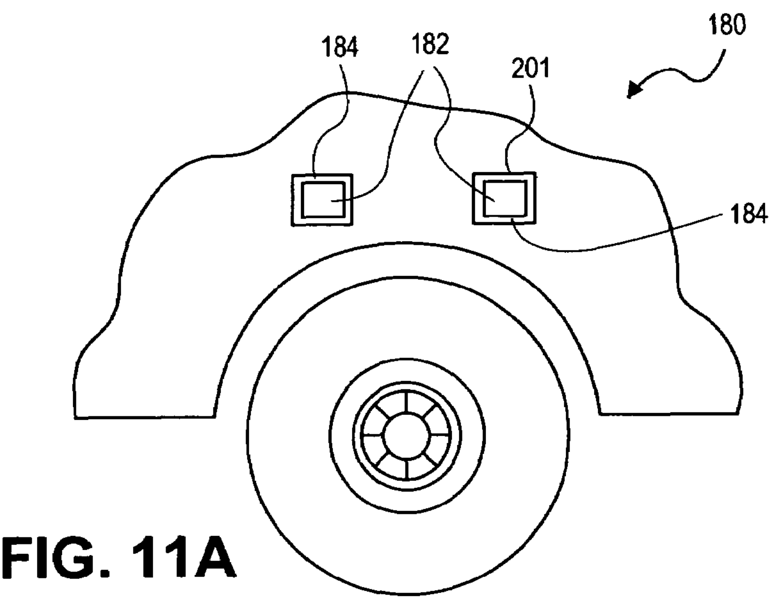
FIG. 11A is a side view of a vehicle body having receivers having integrally formed receivers in accordance with the present invention.

FIG. 11A is a cutaway side view of a vehicle body 180 having receivers 182 formed by transversely extending frame members similar to those described above. The body 180 of FIG. 11A may be a vehicle body of any sort. Advantageously, the transversely extending frame members 184 may be provided in the vehicle at the time of manufacture and apertures formed by the transversely extending frame members 184 may be configured to open outwardly through the body 180 of the vehicle. In this way, vehicles may be manufactured with the receivers 182 configured in a predetermined manner to receive and support specific accessories so that the vehicle is reconfigurable to include any one of a plurality of accessories with their associated advantages.

It is to be noted that while the accessories of FIGS. 10A through 10I have been shown and described mostly in terms of having vertically oriented inserts, the inserts of these and any other accessories may be configured to be longitudinally horizontal inserts and to engage in longitudinally horizontal receivers or sockets. It is to be understood that any or all of the inserts of the present invention may be held in respective receivers by pins such as pin 56 shown in FIG. 8B. Furthermore, coupling structures other than the elongated mating structure shown in the exemplary embodiments of FIGS. 1-8 may be incorporated without departing from the spirit and scope of the invention. Any other vehicle accessories may also be adapted to be coupled to the receivers 182 without limitation.

Figure 11B:
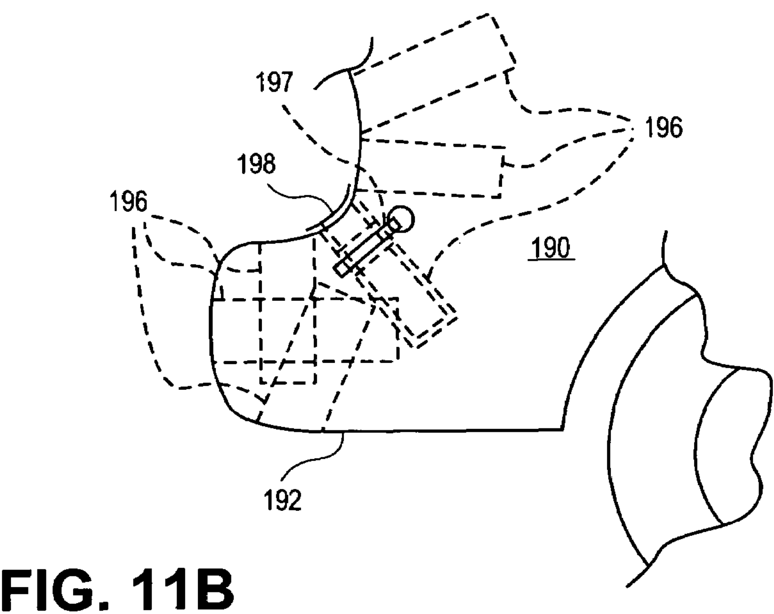
FIG. 11B is a diagrammatic side view of a vehicle body depicting a variety of angles at which the receivers may be oriented.

Additionally, as shown in FIG. 11B, a vehicle body 190 may have an outer surface 192 with a particular contour. Receivers or sockets 196 may be formed by frame members generally as described above. The frame members may be part of an existing chassis or may be added onto the chassis. These frame members may also be configured to open outwardly through the outer surface 192 of the body 190. The receivers 196 may be oriented in any of a variety of positions including horizontal and vertical. While the receivers 196 extend longitudinally generally perpendicular to the outer surface 192, they would still provide the needed structure and function by extending at any angle that is generally transverse to the outer surface 192 as shown by dashed lines in FIG. 11B. Thus, receivers 196 may be provided in a body or a bumper of a truck, sport utility vehicle, or any other vehicle.

Pins 56, 197, or other locking elements, as shown in FIGS. 2, 8B, and 11B, can be used to secure the side panels 40, rear panel 44, rear extension 47, or any of the other accessories described above in their respective apertures. By providing a pin 197 that is insertable concurrently through the frame member and the insert, the panels or other accessories may be fixedly attached against inadvertent withdrawal from their deployed positions of use. To further increase the security of the accessories, locking pins can be provided to prevent theft, for example.

The wide variety of receivers configurations in vehicle bodies, truck beds, and truck platforms together with the wide variety of accessories in accordance with the present invention provide for a highly reconfigurable vehicle or truck bed. Furthermore, the accessories and their functions are considered to be exemplary. For example, the small table 91 and the vice 93 mounted thereon may be replaced by any combination of a table and a tool mounted thereon. For example, the small table 91 could be used to support a circular saw, chop saw, or other construction tool. Likewise, other hunting, fishing, sports, and work accessories may be implemented without departing from the spirit and scope of the present invention.

Figure 11C:
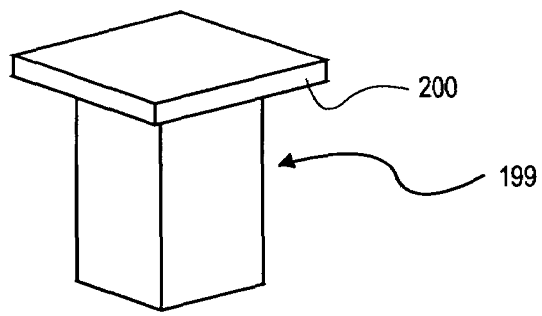
FIG. 11C is a perspective view of a plug or cover for receivers.

While the receivers have been shown and described as having a generally rectangular cross section, it is to be understood that the receivers could be configured to have any cross sectional configuration without departing from the spirit and scope of the invention. For example, the receivers could have a circular, oval, triangular, hexagonal, or any other shape cross section. Additionally, the receivers could have aesthetically appealing caps 198, 199 as shown in FIGS. 11B and 11C, for covering the receivers when not in use. Advantageously, a head 200 of the cap 199 could fit in a recess 201 (shown in FIG. 11A) in a vehicle body or truck bed generally surrounding the receiver for a smooth, uniform, and generally uninterrupted surface of the body or bed when the receiver is not in use.

The frame members 23, 24, and 25, the inserts 42, 45, 48, 115, 125, 135, 145, 155, 165, 174, 179, and other parts of the accessories may be formed of rigid tubular materials such as steel, aluminum, or alloys. Alternatively, these components may be formed of lighter materials such as plastics, polymers, fiberglass, and/or composites, for example. Use of the lighter weight materials has vehicle weight reduction advantages.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, the receivers and accessories of the present invention may be applied to any of a variety of moving objects including vehicles. Such vehicles may include, but are not limited to, trains, airplanes, ATVs, boats, ships, helicopters, buses, tanks, and trailers. Furthermore, the receivers and accessories may be applied to static structures as well. For example, a barbecue accessory may be connected to a motor vehicle for use at a tailgate party. The barbecue accessory may later be brought to a user's home and supported for use in receivers located in or on an outside wall at the home. In this regard it is to be understood that the teachings of the present invention may be applied to a myriad of accessories to provide the advantage of increased versatility by placing receivers in or on movable and/or static structures. As set forth above, the insert and receiver may be reversed, or may be replaced by any of a variety of other supportingly engaging structures. An accessory as defined herein may have an inserts or other supporting structure that is integral with the accessory. Alternatively, the insert may be separably mounted to a rest of the accessory. In this case, the insert or other supporting structure may be coupled to the remaining portion of the accessory by bolts or other fasteners and/or adhered by an adhesive or magnets, for example.

The invention claimed is:

1. A motor vehicle comprising:

a motor vehicle body including a front end and a rear end of the motor vehicle body, the motor vehicle body having a plurality of frame members with a skin of sheet material covering the frame members and at least partially forming a generally vertical side wall, the motor vehicle body extending from the front end to the rear end of the motor vehicle body in a fore and aft direction generally parallel to a direction of travel of the motor vehicle, the motor vehicle body also extending laterally from side to side in a direction that is a generally transverse direction relative to the direction of travel of the motor vehicle, wherein the motor vehicle body includes a truck bed comprising at least a portion of the side wall;

at least one body receiver in the motor vehicle body, said body receiver having structure forming the at least one body receiver, the structure of the body receiver defining a length extending in the transverse direction, the structure of the body receiver also defining an opening in the motor vehicle body, wherein the opening has a width; and the length of the body receiver being greater than the width of the opening of the body receiver, said length of the body receiver extending in a direction that is generally horizontal and non-parallel to the fore and aft direction, wherein the body receiver opens out away from a center of the motor vehicle through the side wall of the truck bed of the motor vehicle body;

at least one accessory selectively received in the at least one body receiver; wherein the receiver is not located in a bumper and the receiver is not a threaded receiver;

the receiver is located above a tire height of the motor vehicle;

the structure forming the at least one body receiver comprises a socket formed by the opening disposed in the body; and the accessory includes an insert connected to the accessory and selectively located in the socket in a deployed state supporting the accessory on the body.

2. The motor vehicle of claim 1, wherein the accessory comprises one or more of: a ladder rack, an electrician's reel, a barbeque accessory, a tool supporting table, a winch, a hunting accessory, a fishing accessory, a bike rack, a ski rack, a ramp, a width extension, and a length extension.

3. The motor vehicle of claim 1, wherein:

the structure provides the socket as a lengthwise horizontal socket; and the insert comprises a shaft having a longitudinal axis disposed horizontally when the insert is in the deployed state.

4. The motor vehicle of claim 3, wherein:

the body receiver is a first body receiver;

the motor vehicle further comprising a plurality of body receivers including said first body receiver.

5. The motor vehicle of claim 4, wherein the plurality of body receivers comprises at least one lengthwise vertical socket.

6. The motor vehicle of claim 5, wherein the plurality of body receivers comprises a plurality of lengthwise horizontal sockets including the lengthwise horizontal socket.

7. The motor vehicle of claim 4, wherein the plurality of body receivers is added to the body of the vehicle.

8. The motor vehicle of claim 1, wherein the vehicle includes a plurality of accessories including the at least one accessory.

9. The motor vehicle of claim 1, further comprising:

a hole in a wall of the socket;

a hole in the insert; and a pin engaged through the hole in the wall of the socket and through the hole in the insert to hold the insert in the socket against inadvertent separation therefrom.

10. A motor vehicle having a truck bed, the truck bed comprising:

a front end and a rear end forming part of a motor vehicle body, the truck bed having a plurality of frame members with a skin of sheet material covering the frame members, the sheet material at least in part forming a side wall of the truck bed, the truck bed extending from the front end to the rear end in a fore and aft direction generally parallel to a direction of travel of the motor vehicle, the truck bed also extending laterally from side to side in a direction that is a generally transverse direction relative to the direction of travel of the motor vehicle;

at least one body receiver in the truck bed, said body receiver having structure forming the at least one body receiver, the structure of the body receiver defining a length extending in the transverse direction, the structure of the body receiver also defining an opening in the truck bed, wherein the opening has a width; and the length of the body receiver being greater than the width of the opening of the body receiver, said length of the body receiver extending in a direction that is generally horizontal and non-parallel to the fore and aft direction, wherein:

the body receiver opens out away from a center of the motor vehicle through the side wall; and the body receiver is not located in a bumper; and at least one accessory selectively received in the at least one body receiver; wherein the structure forming the at least one body receiver comprises a socket formed by the opening disposed in the body;

the accessory includes an insert connected to the accessory and selectively located in the socket in a deployed state supporting the accessory on the body.

* * * * *